(12) United States Patent
Goto et al.

(10) Patent No.: US 9,007,599 B2
(45) Date of Patent: Apr. 14, 2015

(54) DEPTH OF HOLE MEASUREMENT BY SUBTRACTING AREA OF TWO SPECTRA SEPARATED BY TIME

(71) Applicant: Shimadzu Corporation, Kyoto-shi, Kyoto (JP)

(72) Inventors: Hiroomi Goto, Kyoto (JP); Yuzo Nagumo, Kyoto (JP); Rui Kato, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 158 days.

(21) Appl. No.: 13/859,405

(22) Filed: Apr. 9, 2013

(65) Prior Publication Data
US 2013/0265587 A1    Oct. 10, 2013

(30) Foreign Application Priority Data
Apr. 9, 2012    (JP) ................. 2012-088786

(51) Int. Cl.
*G01B 11/02*    (2006.01)
*G01B 11/06*    (2006.01)

(52) U.S. Cl.
CPC ............ *G01B 11/06* (2013.01); *G01B 11/0633* (2013.01)

(58) Field of Classification Search
CPC .......................... G01B 11/0675; G01B 11/06
See application file for complete search history.

(56) References Cited

U.S. PATENT DOCUMENTS

| | | | |
|---|---|---|---|
| 6,589,869 B2 | 7/2003 | Sarfaty et al. | |
| 6,645,045 B2 | 11/2003 | Ohkawa | |
| 6,815,228 B2 | 11/2004 | Usui et al. | |
| 6,903,826 B2 | 6/2005 | Usui et al. | |
| 6,961,131 B2 | 11/2005 | Usui et al. | |
| 7,009,714 B2 | 3/2006 | Ohmoto et al. | |
| 7,009,715 B2 | 3/2006 | Usui et al. | |
| 7,230,720 B2 | 6/2007 | Usui et al. | |
| 7,259,866 B2 | 8/2007 | Usui et al. | |
| 7,411,684 B2 | 8/2008 | Usui et al. | |
| 2008/0216956 A1 | 9/2008 | Nakamoto et al. | |
| 2013/0235383 A1* | 9/2013 | Boccara et al. ............... | 356/479 |

FOREIGN PATENT DOCUMENTS

| | | | |
|---|---|---|---|
| JP | 10-325708 | A | 12/1998 |
| JP | 11-274259 | A | 10/1999 |
| JP | 2002-081917 | A | 3/2002 |
| JP | 2004-507070 | A | 3/2004 |
| JP | 2004-253516 | A | 9/2004 |
| JP | 2005-184013 | A | 7/2005 |
| JP | 2008-218898 | A | 9/2008 |
| WO | 01/23830 | A1 | 4/2001 |

* cited by examiner

*Primary Examiner* — Hwa Lee
(74) *Attorney, Agent, or Firm* — Sughrue Mion, PLLC

(57) ABSTRACT

A measurement light having a predetermined wavelength bandwidth from a light source is radiated onto the structure to be measured in a specimen 50, light reflected from a first plane and second plane of the structure to be measured is made to interfere in an optical fiber, and a spectrum of the interference light is generated. This interference light spectrum is acquired by a spectrometric unit at two time points separated in time, and in data processing unit, absolute difference area computation unit determines the absolute difference area of the difference spectrum. This absolute difference area changes periodically each time the dimension of the structure to be measured changes by $\lambda/4$, making it possible to determine the dimension of the structure to be measured based on that change.

2 Claims, 6 Drawing Sheets

(a) Hole (level difference) depth measurement (b) Film thickness (plate thickness) measurement (a) Etching depth d=19.5 μm d=19.52um (b) Difference spectrum (c) Etching depth d=19.5 μm d=19.6um (d) Difference spectrum (a)

(b)

Etching depth (nm)

DEPTH OF HOLE MEASUREMENT BY SUBTRACTING AREA OF TWO SPECTRA SEPARATED BY TIME

TECHNICAL FIELD

The present invention relates to a surface treatment status monitoring device for measuring, in process and substantially in real time, the depth or level difference of small holes, such as TSVs (=Through-silicon Vias), formed in a semiconductor substrate or the like through various types of etching processes; the thickness of substrates, liquid crystals and the like, whereof the surface is removed through various types of polishing processes; or the film thickness and the like when growing a film on a substrate surface by CVD, etc.

BACKGROUND ART

In the manufacturing process of semiconductor integrated circuits, etching using low pressure plasma or the like is performed to form very small holes and grooves in a semiconductor substrate such as a silicon wafer. Conventionally, in an etching process, the etching is performed after first masking, by a resist film, the areas of a substrate where no holes or grooves are to be formed. As a result, only the areas which have not been masked are selectively etched away, allowing holes and grooves of arbitrary shape to be formed upon removing the resist film after etching. The depth of holes and grooves formed in this way depends on various parameters, such as the etching time, the gas type, gas pressure, etc., and thus, to make the depth of a hole or groove to a target depth, control is performed whereby the etching stop point is determined and the parameters are adjusted while monitoring the actual depth in-process.

Furthermore, contrary to the case of etching, film growth processes are also carried out, in which an oxide film, metal film or the like is formed in the areas which have not been masked, and in such cases as well, it is necessary to monitor the thickness of the film growth area in order to determine the end point of the process.

Various proposals have been made in the prior art with regard to technology for optically measuring the depth and level difference of micro-holes formed by etching, the film thickness of a film layer to be removed, the thickness of a substrate or liquid crystal whereof the surface is to be gradually removed by polishing or the like, the thickness of a grown film, and so forth, as will be described below.

Patent Literatures 1 through 3 disclose a device which acquires interference spectrum data by spectrometric measurement of interference light generated through interference between reflected light from the bottom of the hole or groove to be measured and reflected light from the perimeter of the hole or the top edges of the groove, or interference light generated through interference between reflected light from the top surface of the substrate, which is to be measured, and reflected light from the bottom surface of the substrate; analyzes interference fringes through spectral fitting, and computes the hole or groove depth or the substrate or film layer thickness based on those interference fringes.

Furthermore, Patent Literature 4 discloses finding the film thickness by acquiring interference spectrum data through spectrometric measurement of interference light generated through interference between reflected light from two surfaces of the film layer to be measured, and performing a Fourier transform on the spectrum.

Furthermore, Patent Literatures 5 and 6 disclose checking the progress of a process by applying time differentiation to an interference spectrum acquired through spectrometry, and comparing the calculated time differential spectrum and a past reference spectrum, which has been determined in advance, which satisfied the desired process parameters.

Patent Literature 7 describes the technology of detecting the point at which etching has advanced by $\lambda/4$ by irradiating an etched structure with a laser of wavelength $\lambda$ and detecting the maximum and minimum interference amplitude of the reflected waves.

PRIOR ART LITERATURES (Patent Literature 1) Japanese Unexamined Patent Application Publication H11-274259
(Patent Literature 2) Japanese Unexamined Patent Application Publication 2004-507070
(Patent Literature 3) Japanese Unexamined Patent Application Publication 2004-253516
(Patent Literature 4) Japanese Unexamined Patent Application Publication 2005-184013
(Patent Literature 5) Japanese Unexamined Patent Application Publication 2002-81917
(Patent Literature 6) Japanese Unexamined Patent Application Publication 2008-218898
(Patent Literature 7) Japanese Unexamined Patent Application Publication H10-325708

Among the prior art described above, the methods described in Patent Literatures 1 through 3 involve analysis of interference fringes through fitting, and thus cannot accommodate phenomena with rapid change over time (etching, film growth).

The method described in Patent Literature 4 has the advantage that an absolute value is ensured, but the measurement precision is low. With the methods described in Patent Literatures 5 and 6, the progress of the process is checked based on a comparison between a time differential spectrum and past data which satisfied the desired process parameters, acquired in advance and stored in a database, so measurement of dimensions (numerical values) such as thickness and depth is not possible.

The method described in Patent Literature 7 has the disadvantage that, in cases where the structure (hole, deposited material) to be etched or grown as film is relatively small, as shown in FIG. 7 (FIG. 12 of Patent Literature 7), the intensity change indicating the maximum and minimum becomes small and is readily buried by noise.

The present invention provides a method which makes it possible to perform measurements, robust against noise, for monitoring of etching depth or deposition thickness that changes moment to moment in the process of etching or film growth.

SUMMARY OF THE INVENTION

The present invention, made to resolve the aforementioned problem is a surface treatment status monitoring device which measures a dimension of a structure to be measured, such as the depth or level difference of a hole or groove formed on a substrate through surface treatment, or the increasing or decreasing thickness of a film layer or substrate, and which includes a light source which generates measurement light having a predetermined wavelength bandwidth, an interference optical system which generates interference of light reflected respectively from a first plane and a second plane of the structure to be measured, a spectrometric unit which disperses wavelength of the interference light generated by the interference optical system, and a detection unit which detects the intensity of each wavelength of light dispersed by the spectrometric unit and generates a spectrum, the device comprises:

a) a spectrum acquisition unit which acquires the spectrum of interference light with said detection unit at two time points separated in time;

b) a difference area computation unit which determines the absolute difference area of two spectra obtained by said spectrum acquisition unit; and c) an analysis unit which determines the dimension of the structure to be measured based on change in said absolute difference area.

The surface treatment in the present invention is typically the formation of holes, grooves and the like by etching (including dry etching and wet etching), surface removal by polishing (including chemical polishing and mechanical polishing), formation of a film layer by CVD (Chemical Vapor Deposition) and the like, and so forth.

When the structure to be measured is a substrate, the aforesaid first plane and second plane are the top surface and bottom surface of the substrate. When the structure to be measured is a film layer formed on a substrate, the aforementioned first plane and second plane are the top surface and bottom surface of the film layer. When the structure to be measured is a hole or groove formed in the top surface of a substrate, the aforementioned first plane and second plane are the bottom surface of the hole or groove and the surface of the hole perimeter or top edges of the groove.

The interval $\Delta t$ between the two time points at which the aforementioned two interference light spectra are acquired should be made a value such that the value obtained by multiplying the rate of change v of the dimension of the structure to be measured by the time interval $\Delta t$ will be smaller than ¼ of the central wavelength $\lambda$ of the measurement light (¼ $\lambda$).

In the surface treatment status monitoring device according to the present invention, the area (integrated value in the wavelength direction) corresponding to the change of the interference fringe waveform from a given moment in time is monitored using a light source which has not a single wavelength but rather a certain wavelength bandwidth. Specifically, the absolute difference area of the spectrum of interference light produced by light reflected from two areas of the structure to be measured is determined. Thus, monitoring is performed using all the wavelength direction information from the light source. The change of absolute difference area of this spectrum indicates change corresponding to increase or decrease of the central wavelength, and the magnitude of this change, when compared to the case of measurement using a single wavelength, is multiplied roughly by the number of measurement wavelengths (i.e. the number of channels of the array detector of the spectroscope). Furthermore, the noise component is summed in the wavelength axis direction, so its magnitude is a square root multiple of the number of measurement wavelengths. This is the same as the concept of count averaging. Thus, according to the present invention, it becomes possible to perform high S/N ratio measurement of dimensional change of the structure to be measured.

DETAILED DESCRIPTION OF THE EXEMPLARY EMBODIMENTS

Figure 1:
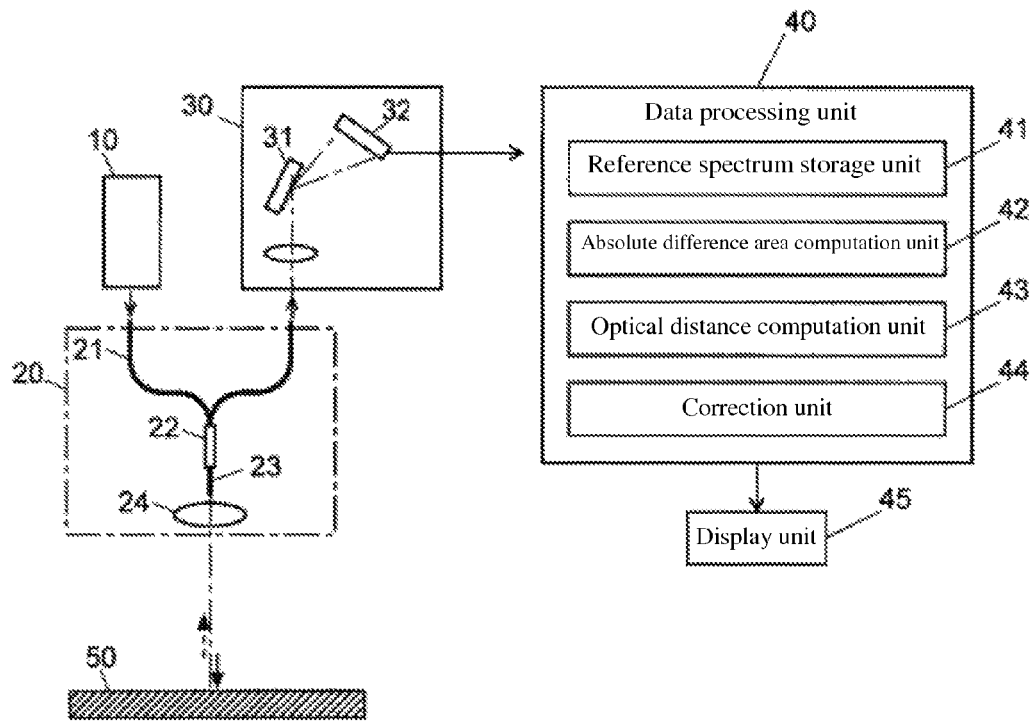
FIG. 1 is a simplified diagram of a surface treatment status monitoring device which is an example of embodiment of the present invention.
Figure 2:
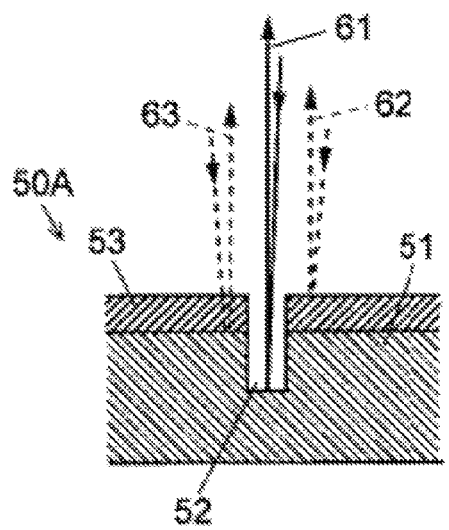
FIG. 2 is a schematic of the state of reflected light during hole depth measurement (a) and during substrate thickness measurement (b) in the surface treatment status monitoring device of the present example of embodiment.
Figure 2:
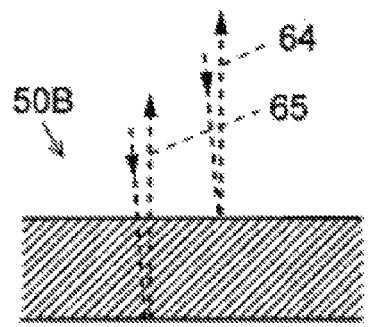

A surface treatment status monitoring device constituting an example of embodiment of the present invention will be described with reference to the appended drawings. FIG. 1 is a simplified diagram of the surface treatment status monitoring device of the present example of embodiment, and FIG. 2 is a schematic of the state of reflected light during hole depth measurement (a) and during substrate thickness measurement (b).

This surface treatment status monitoring device is a device which monitors the distance to a specimen 50 which changes moment to moment, such as the substrate thickness of the specimen 50 being processed or the depth of a trench being formed using, for example, a plasma etching device or a substrate polishing device. This device comprises a light source 10, a measurement optical system 20, a spectrometric unit 30, and a data processing unit 40. The light source 10 and measurement optical system 20, and the measurement optical system 20 and spectrometric unit 30, are connected with optical fiber.

As the measurement light source 10, for example, a superluminescent diode (SLD) with a central wavelength of 830 nm and a full width at half maximum of 15 nm, or another light source having an equal or greater wavelength bandwidth can be used. The measurement light emitted from this light source 10 is taken up into input side optical fiber 21, travels via fiber coupler 22 and through optical fiber 23, and is outputted into space from the end of optical fiber 23. The measurement light outputted from the end of optical fiber 23 is radiated onto the specimen 50 via collimator lens 24.

The state of interference in the structure to be measured in specimen 50 will be described using FIG. 2. For example, when measuring the thickness of the substrate 50B during polishing, as shown in FIG. 2(b), interference is generated by two reflected lights—reflected light 64 from the top surface of the substrate 50B and reflected light 65 from the bottom surface due to light which has penetrated into the substrate 50B. Furthermore, when measuring trench depth during etching, as shown in FIG. 2(a), interference mainly occurs between reflected light 62 from the top surface of resist layer 53 on the top surface of substrate 51, reflected light 63 from the top surface of substrate 51 due to light which penetrated into the resist layer 53, and reflected light 61 from the bottom surface of one or multiple trench holes 52 constituting the etched area. These reflected lights 61 through 63 or 64 through 65 return back through the collimating lens 24 in the opposite direction to light irradiation and enter the optical fiber 23. The reflected lights then pass through fiber coupler 22 and arrive at spectrometric unit 30. Before they have passed through the optical fiber 23 and reached the spectrometric unit 30, the multiple reflected lights interfere thoroughly to form interference light.

In spectrometric unit 30, wavelength of the interference light is dispersed by a spectrometric unit such as a diffraction grating 31, and light of multiple wavelengths is detected simultaneously by an array detector 32 of CCD line sensors or the like. A detection signal corresponding to each wavelength of the array detector 32 is inputted into data processing unit 40. The data processing unit 40 contains, as functional blocks, reference spectrum storage unit 41, absolute difference area computation unit 42, optical distance computation unit 43 and correction unit 44, and executes the processing described below to compute the thickness of the polished array 50B or the depth of the trench hole 52 which is the etched area. The computed results are presented to the observer by unit of display unit 45.

It will be noted that the data processing unit 40 is in substance a personal computer, and the functions of the data processing unit 40 can be implemented by executing data processing software preinstalled on the computer.

First, the principle of the data processing in the data processing unit 40 will be explained. When light $Ref(\omega)$ having a wavelength spread with a normal distribution shape of dispersion $\sigma$, centered on wavelength $\lambda$ (here, $\omega$ is frequency, $\omega=1/\lambda$), is inputted from light source 10, $F_A(\omega)$ and $F_B(\omega)$ are the spectra of light reflected from two surfaces A and B respectively (where, for example, surface A is the substrate top surface and surface B is the etching bottom surface) due to the thickness d of the film layer (or the depth of the etching hole, etc.) which is the structure to be measured. Assuming $A_A$ and $A_B$ to be the amplitude of the reflected light from surface A and surface B respectively, $F_A(\omega)$ and $F_B(\omega)$ will be given by the following formulas (1) and (2) respectively.

$$F_A(\omega) = \sqrt{[Ref(\omega)]} \cdot A_A \cdot \exp(kx - \omega t + 0) \quad (1)$$

$$F_B(\omega) = \sqrt{[Ref(\omega)]} \cdot A_B \cdot \exp(kx - \omega t + 2d\omega \cdot 2\pi) \quad (2)$$

Here, kx is a constant. The light obtained through spectrometry is a result of interference between the above two reflected lights $F_A(\omega)$ and $F_B(\omega)$, and the spectrum $F(d, \omega)$ of the interference light is represented by formula (3).

$$\begin{aligned}F(d, \omega) &= |F_A(\omega) + F_B(\omega)|^2 \quad (3)\\ &= Ref(\omega)[A_A^2 + A_B^2 + 2A_A A_B \cos(2d\omega \cdot 2\pi)]\\ &= (A_A^2 + A_B^2)Ref(\omega) + 2A_A A_B Ref(\omega)\cos(2d\omega \cdot 2\pi)\end{aligned}$$

Here, assuming $F(d+\Delta d, \omega)$ is the interference spectrum obtained at a time point when the optical path length has progressed by a small distance $\Delta d$ from time point d, the difference $Fs(\omega)$ between the two interference spectra will be $$\begin{aligned}Fs(\omega) &= F(d+\Delta d, \omega) - F(d, \omega) \quad (4)\\ &= 2A_A A_B Ref(\omega)[\cos(2(d+\Delta d)\omega \cdot 2\pi) - \cos(2d\omega \cdot 2\pi)]\\ &= -4A_A A_B Ref(\omega)\sin(2\pi\Delta d \cdot \omega)\sin(4\pi d\omega - 2\pi\Delta d\omega)\end{aligned}$$

Here, $\Delta d \cdot \omega$ can be considered essentially constant across the wavelength bandwidth of the light source, so leaving it at $\Delta d \cdot \omega_c$, the difference spectrum becomes as follows.

$$Fs(\omega) = -4A_A A_B Ref(\omega)\sin(2\pi\Delta d \cdot \omega_c)\sin(4\pi d\omega - 2\pi\Delta d\omega_c) \quad (5)$$

The square $S^2$ of the area of the absolute value of this difference spectrum (the absolute difference area) is calculated. Since light $Ref(\omega)$ from the light source has a Gaussian distribution of wavelength bandwidth $\sigma$, and $Ref(\omega) = \exp(-(\omega-\omega_0)^2/\sigma^2)$, $$\begin{aligned}\{S(\Delta d)\}^2 &= \int \{Fs(\omega)\}^2 d\omega \quad \left(\int \text{ is from} -\infty \text{ to} +\infty\right) \quad (6)\\ &= 16 A_A^2 A_B^2 \sin^2(2\pi\Delta d \cdot \omega c) \int \left\{\begin{array}{l}\exp(-2(\omega-\omega 0)^2/\sigma^2)\\ \sin^2(4\pi d\omega - 2\pi\Delta d\omega c)\end{array}\right\} d\omega\\ &= 16 A_A^2 A_B^2 \sin^2(2\pi\Delta d \cdot \omega c)\\ &\quad \left\{\begin{array}{l}1/2(\sigma/\sqrt{(2\pi)}) - \\ \sigma/(2\sqrt{(2\pi)})\exp(-8\pi^2 d^2 \sigma^2)\cos^2(8\pi d\omega - 4\pi\Delta d\omega c)\end{array}\right\}\end{aligned}$$

Here, once etching has progressed to a certain extent, the depth d becomes sufficiently greater than the wavelength bandwidth $\sigma$ of the light source and $\exp(-8\pi^2 d^2 \sigma^2)$ becomes essentially 0, so the square $S^2$ of the absolute difference area becomes $$S^2 = 4\sqrt{(2)}(\alpha/\sqrt{\pi}))A_A^2 A_B^2 \sin^2(2\pi\Delta d \cdot \omega_c) \quad (7)$$

Namely, $S^2$ exhibits a maximum value when $\Delta d = \lambda/4$.

Furthermore, with respect to the area immediately after start of etching where d is still very small and $\exp(-8\lambda^2 d^2 \sigma^2)$ cannot be considered to be essentially 0, since the spectrum when d=0 at the start of etching is used for the difference, $\cos^2(8\pi d\omega - 4\pi\Delta d\omega_c)$ in formula (6) becomes $\cos^2(-4\pi\Delta d\omega_c)$, and the second term of formula (6) also exhibits a maximum value 0 when $\Delta d = \lambda/4$.

The etching depth can be measured by measuring the change in absolute difference area S in this manner. Measurement of dimensional change of the structure to be measured using this area change is also possible beyond $\lambda/4$, but the calculation is simplified by using the spectrum at the time of the maximum value as the reference spectrum for determining the next maximum value. Namely, in this case, a spectrum for which $d = k \cdot \lambda/4$ (k is an integer) is always used as the reference for determination of difference, and as a result, $\cos^2(8\pi d\omega - 4\pi\Delta d\omega_c) = \cos(-4\pi\Delta d\omega_c)$ obtains, and $S^2$ exhibits a maximum value at $\Delta d = \lambda/4$.

Figure 3:
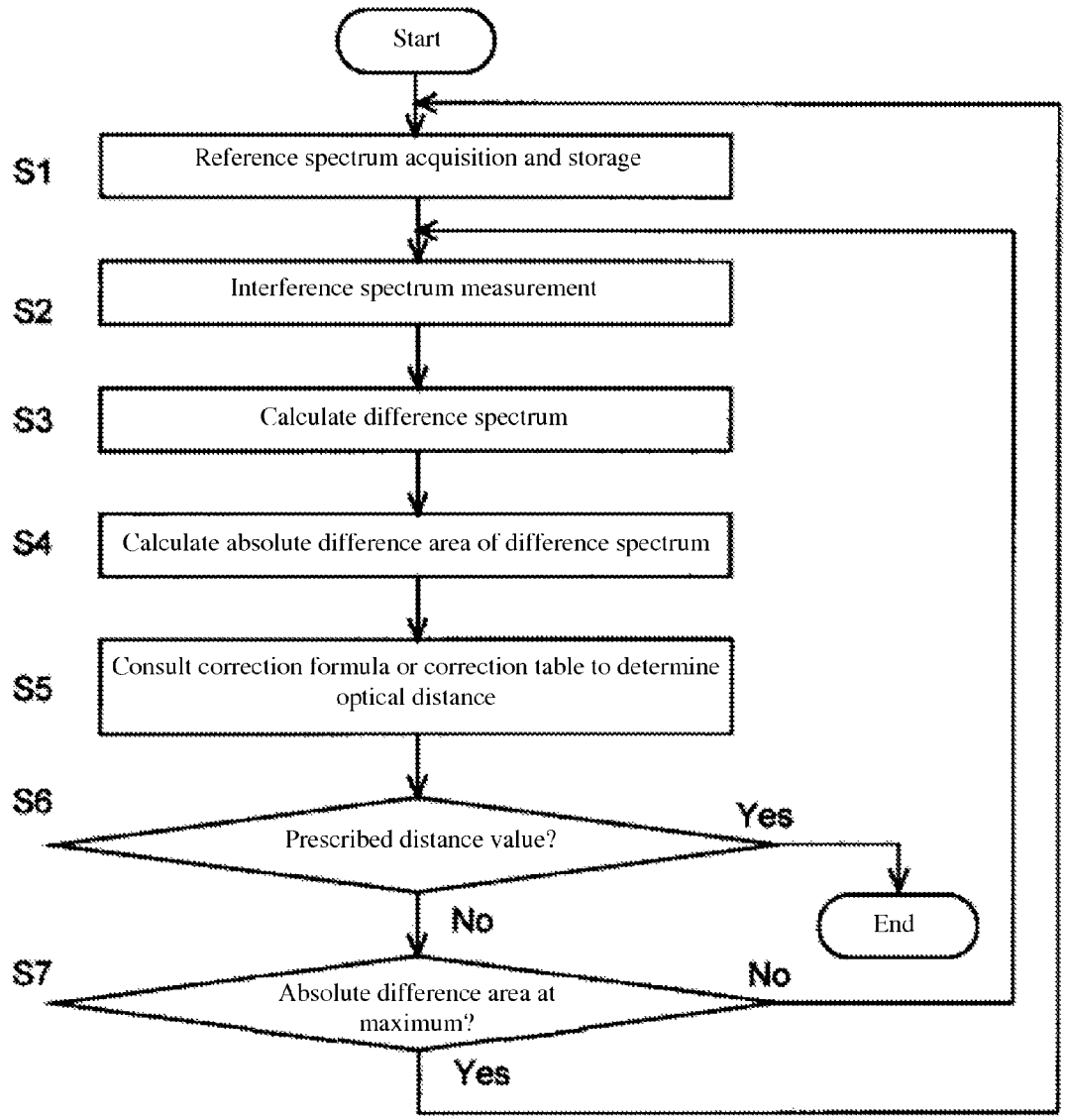
FIG. 3 is a flow chart showing the measurement operation in the surface treatment status monitoring device of the present example of embodiment.

Data processing unit 40 performs this calculation by a procedure as shown in FIG. 3. Namely, the measurement is initiated upon initiating the etching process, and at the initial time point (d=0), spectrum data transmitted from spectrometric unit 30 is stored in reference spectrum storage unit 41 (step S1).

Then, as the etching process progresses, two areas (high point and low point) arise in the structure to be measured, and reflected light from the two areas interferes and is measured as interference light by the spectrometric unit 30 (step S2).

Data processing unit 40 receives the interference light spectrum from the spectrometric unit 30 and computes the difference spectrum between this spectrum and the spectrum stored in reference spectrum storage unit 41 (step S3). Then, absolute difference area computation unit 42 computes the absolute difference area of the difference spectrum (step S4). Based on the value of this absolute difference area, optical distance computation unit 43 determines the optical distance, i.e. the etching depth, using a correction formula stored in correction unit 44, or by collating with a correction table stored in correction unit 44 (step S5). The correction formula or correction table stored in correction unit 44 can be determined in advance by measuring the relationship between known level difference and the absolute difference area of a structure to be measured, using the same light source 10.

Next, if the found etching depth is not at the prescribed value (No in step S6), it is evaluated if the current absolute difference area is the maximum value (step S7). This can be determined based on a correction formula or correction table, or from the change in area value itself. If it was determined that the current value is the maximum value, the interference light spectrum at that point in time is stored as the reference spectrum in reference spectrum storage unit 41 (step S1). Subsequently, the absolute difference area of the reference spectrum and the interference spectrum at various time points is measured. Furthermore, if it was determined in step S7 that the current absolute difference area is not the maximum value, the flow returns to step S2. In this case, the reference spectrum is not updated.

The etching depth is measured in this manner, and when the depth has reached the prescribed value (Yes in step S6), the etching process is terminated.

Figure 4:
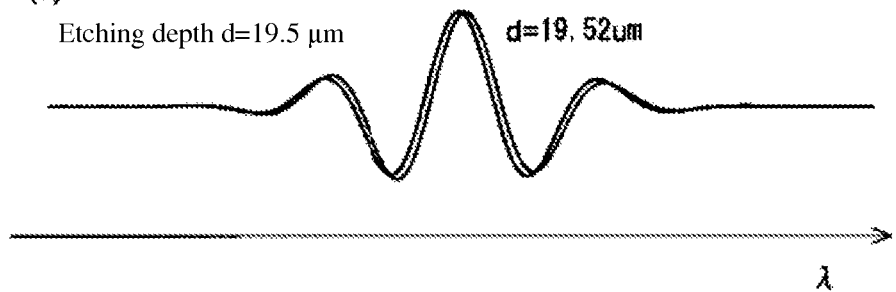
FIG. 4 is a drawing intended to explain the principle of the present invention, where (a) is an overlay of the reference spectrum and the spectrum after etching has progressed slightly, (b) is the difference spectrum thereof, (c) is an overlay of the reference spectrum and the spectrum after etching has progressed significantly, and (d) is the difference spectrum thereof.
Figure 4:
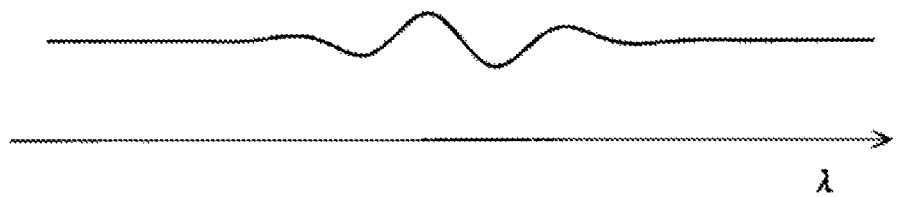
Figure 4:
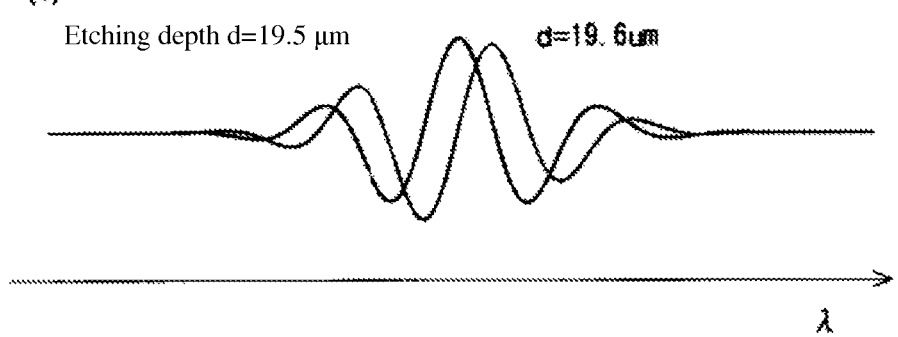
Figure 4:
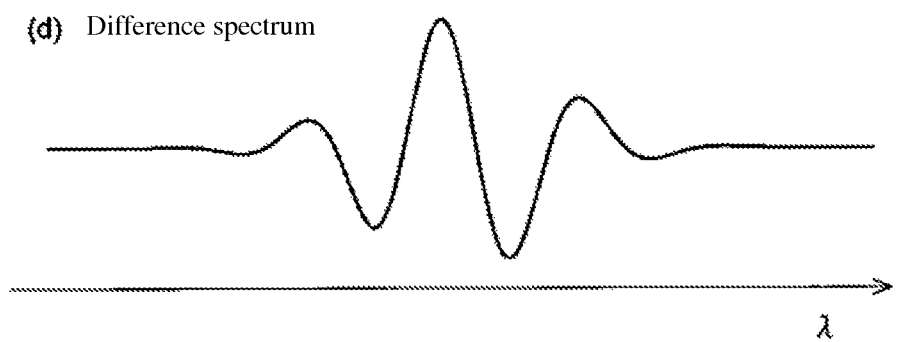

Next, an actual calculation example will be described. In FIG. 4(a), interference fringes from when the hole depth d=19.5 μm (micrometers) as measured using a light source with a central wavelength of 830 nm and a wavelength bandwidth of 15 nm have been overlaid with interference fringes from when the etching has progressed another 0.02 μm and d=19.52 μm. The difference between these two interference fringe spectra is as shown in FIG. 4(b).

In FIG. 4(c), interference fringes from when the hole depth d=19.5 μm (micrometers) have been overlaid with interference fringes from when etching has further advanced 0.1 μm to d=19.6 μm, and FIG. 4(d) shows the difference spectrum thereof.

Figure 5:
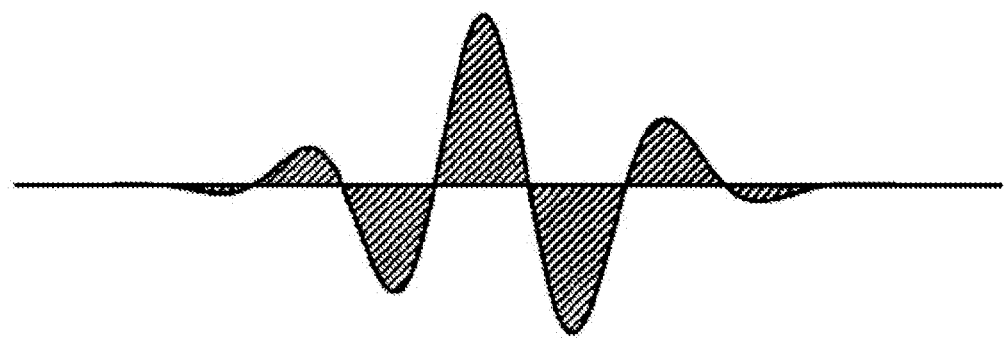
FIG. 5 is a drawing intended to explain the principle of the present invention, where (a) is a conceptual drawing representing the absolute difference area of the difference spectrum and (b) is a drawing illustrating the change in absolute difference area as etching progresses.
Figure 5:
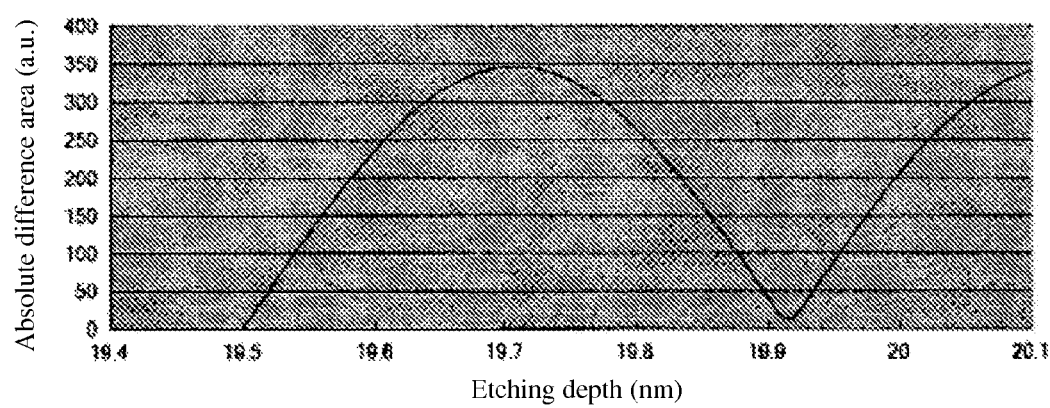

As can be seen by comparing FIGS. 4(b) and (d), as etching progresses, the offset between interference fringes increases. The aforementioned absolute difference area is a computation of this offset. A conceptual drawing of absolute difference area is shown in FIG. 5(a) and change thereof as etching progresses is shown in FIG. 5(b). As is clear from FIG. 5(b), the offset between the two interference fringe spectra reaches its maximum when the phase difference between the two interference fringe spectra becomes λ, i.e. when the etching depth has advanced by λ/4=0.2075 μm.

By taking the time point when this area reaches maximum as a new reference time t0 and again monitoring the area of the difference waveform, it is possible to detect each time the etching has progressed by λ/4.

Etching depth, film thickness and the like can be measured with the device of the present example of embodiment as indicated above. The noise suppression effect thereof will be described next.

Normally, shot noise Nph decreases in an inverse proportion to the square root of the average count K, so if S is the signal intensity and N is the noise intensity, the averaged signal intensity S', N' and S/N ratio SNR' can be expressed as in formulas (8) through (10).

$$S' = (\Sigma_K S)/K = S \tag{8}$$

$$N' = (\Sigma_N N)/K = (1/\sqrt{K}) \cdot N \tag{9}$$

$$SNR' = S/((1/\sqrt{K}) \cdot N) = \sqrt{K} \cdot SNR \tag{10}$$

The S/N ratio for the area change during the above-described etching depth measurement can be calculated as follows. Assuming K to be the number of pixels of the array detector in the wavelength axis direction and assuming the interference fringe intensity distribution in the wavelength axis direction to be constant for the sake of simplicity, the signal intensity S", noise intensity N" and S/N ratio SNR" will be $$S'' = (\Sigma_K S) = K \cdot S \tag{11}$$

$$N'' = (\Sigma_N N) = KN' = \sqrt{K} \cdot N \tag{12}$$

$$SNR'' = K \cdot S/(\sqrt{(K)} \cdot N) = \sqrt{K} \cdot SNR \tag{13}$$

Based on formula (13), with respect to the area change, similar to the effect of averaging, the S/N ratio increases $\sqrt{K}$ times as compared to the S/N during measurement with one point only (short wavelength only).

Figure 6:
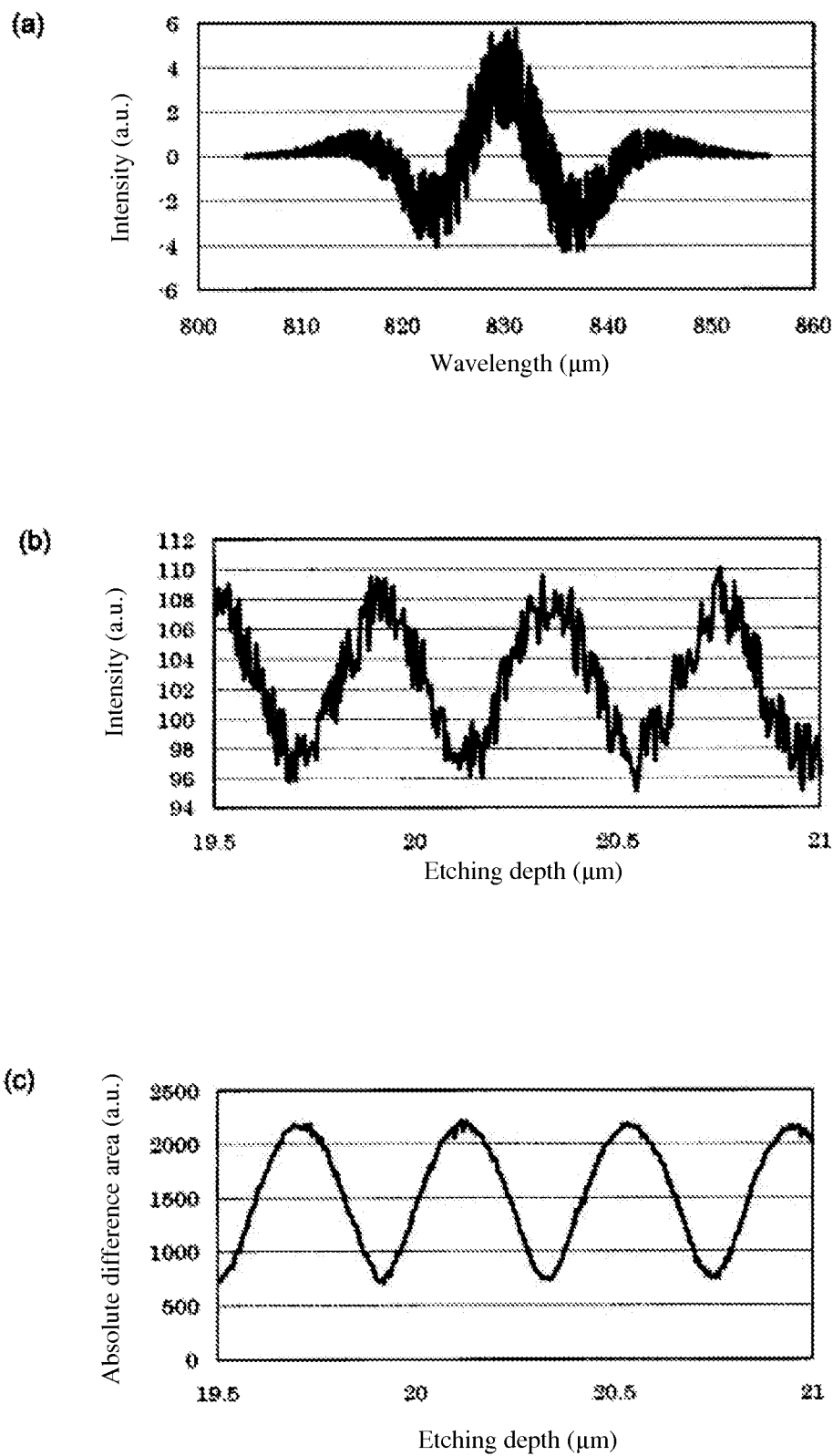
FIG. 6 is a calculation example for an example of embodiment of the present invention, where (a) is the waveform of an interference spectrum overlaid with 50% noise, (b) is a drawing showing the change in difference spectrum as etching progresses, measured using a single wavelength, and (c) is a drawing showing the change in absolute difference area according to the present invention.
Figure 7:
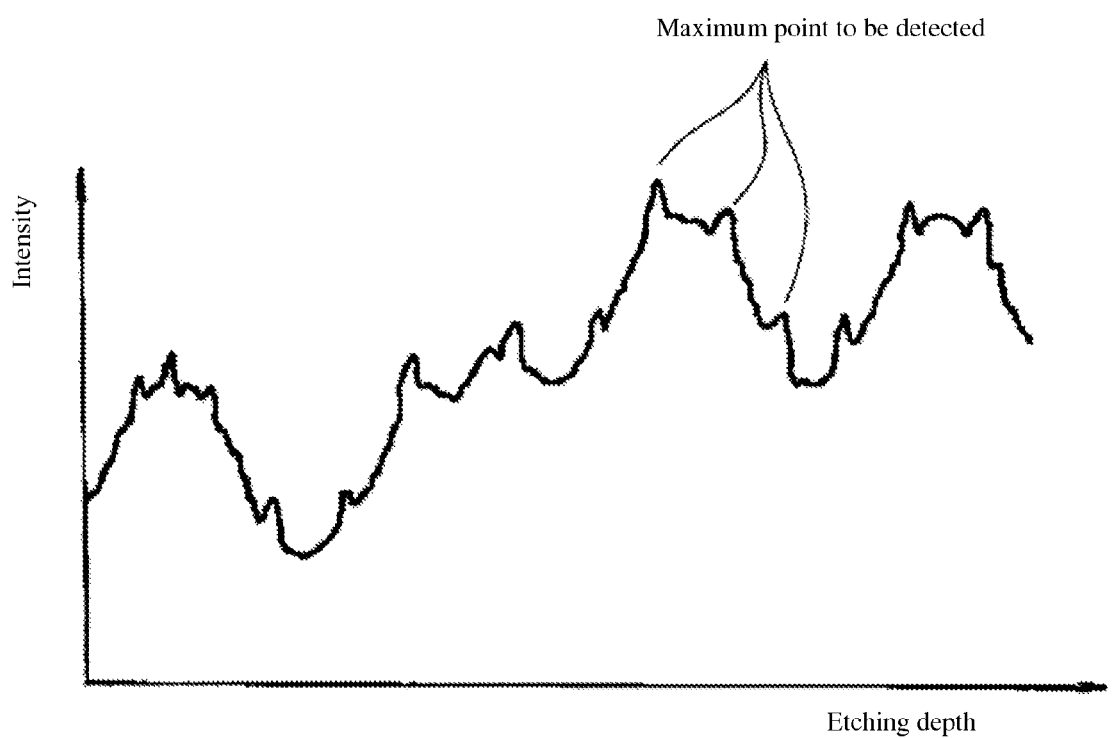
FIG. 7 is a waveform diagram of change over time of reflected diffracted light intensity when measuring etching depth according to the prior art.

This noise suppression effect will be described using an example based on simulation. FIG. 6(a) shows an interference spectrum overlaid with 50% noise. If the structure to be measured is sufficiently small in relation to the irradiated area of the measurement light, the interference amplitude will be small in relation to the size of the observed spectrum, so the situation shown in FIG. 6(a) will occur. Here, when monitoring the increase and decrease (maximum and minimum) of a given wavelength in the observed spectrum, the noise component is substantial, as shown in FIG. 6(b), and determination of maximum and minimum becomes difficult. Performing averaging for noise is one solution that may be considered, but averaging in the time axis direction has an adverse effect on measurement (maximum/minimum detection) for the purpose of accurately determining change over time.

By contrast, the absolute difference area is a value integrated in the wavelength axis direction, so the noise overlaid onto the area change is reduced, as explained above. Here, FIG. 6(c) shows the area change of the interference waveform for which the difference was determined using the interference waveform at 19.5 μm as reference, and as is clear when comparing this to FIG. 6(b), the device and method of the present example of embodiment greatly facilitates the detection of maximum and minimum.

It should be noted that the above example of embodiment is no more than one example of the present invention, and corrections, addition and modification made within the gist of the present invention are clearly included within the scope of patent claims of the present application.

EXPLANATION OF REFERENCES

10 . . . Light source
20 . . . Measurement optical system
21 . . . Input side optical fiber
22 . . . Fiber coupler
23 . . . Optical fiber
24 . . . Collimator lens
30 . . . Spectrometric unit
31 . . . Diffraction grating 32 ... Array detector
40 ... Data processing unit
41 ... Reference spectrum storage unit
42 ... Absolute difference area computation unit
43 ... Optical distance computation unit
44 ... Correction unit
45 ... Display unit
50 ... Specimen
50A, 50B, 51 ... Substrate
52 ... Trench hole
53 ... Resist layer
61-65 ... Reflected light

What is claimed is:

1. A surface treatment status monitoring device which measures a dimension of a structure to be measured, such as the depth or level difference of a hole or groove formed on a substrate through surface treatment, or the increasing or decreasing thickness of a film layer or substrate, and which includes a light source which generates measurement light having a predetermined wavelength bandwidth, an interference optical system which generates interference of light reflected respectively from a first plane and a second plane of the structure to be measured, a spectrometric unit which disperses wavelength of the interference light generated by the interference optical system, and a detection unit which detects the intensity of each wavelength of light dispersed by the spectrometric unit and generates a spectrum, the device comprising:
 a) a spectrum acquisition unit which acquires the spectrum of interference light with said detection unit at two time points separated in time;
 b) a difference area computation unit which determines the absolute difference area of two spectra obtained by said spectrum acquisition unit; and
 c) an analysis unit which determines the dimension of the structure to be measured based on change in said absolute difference area.

2. A surface treatment status monitoring device as described in claim 1, wherein said spectrum acquisition unit automatically adjusts the interval $\Delta t$ between the two time points at which two interference light spectra are acquired during measurement such that the value obtained by multiplying the rate of change v of the dimension of the structure to be measured by the time interval $\Delta t$ will be smaller than ¼ of the central wavelength $\lambda$ of the measurement light.

* * * * *